Apr. 3, 1923.

J. G. RIEFF.
DETACHABLE CHAIN HOOK.
FILED JAN. 24, 1922.

1,450,388.

Witness:
R. E. Weber

Inventor:
John G. Rieff
By
Attorneys:

Patented Apr. 3, 1923.

1,450,388

UNITED STATES PATENT OFFICE.

JOHN G. RIEFF, OF LONDON, WISCONSIN.

DETACHABLE CHAIN HOOK.

Application filed January 24, 1922. Serial No. 531,333.

*To all whom it may concern:*

Be it known that I, JOHN G. RIEFF, a citizen of the United States, and resident of London, in the county of Dane and State of Wisconsin, have invented certain new and useful Improvements in Detachable Chain Hooks; and I do hereby declare that the following is a full, clear, and exact description thereof.

My invention relates to a detachable chain hook for connecting together two links of a chain, the same being shown in the present instance, as used for uniting the ends of an anti-skid chain section for which purpose the hook is particularly adapted.

The primary object of the invention is to provide a device which may be readily attached or detached from the chain links, and which, when in position, is securely locked against accidental removal.

More specifically, the object of the invention is to provide a hook for the purpose described, with a locking loop in such a manner that the hook can be inserted or removed only by drawing the ends of the links to be connected thru the loop.

My invention will be better understood from the following description taken in connection with the accompanying drawing, in which Figure 1 is a cross sectional view thru a wheel rim and tire, with my invention applied thereto.

Figure 1:
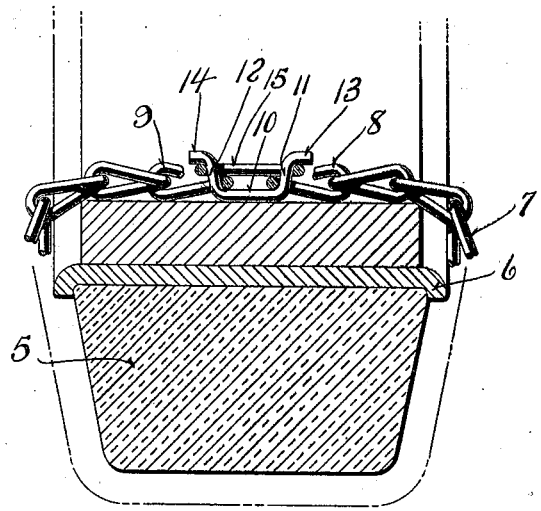
Figure 2:
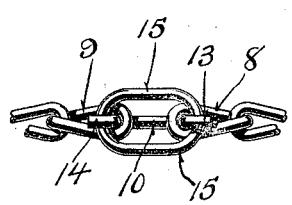
Figure 2 is a plan view of the invention.

Referring more particularly to the drawing, the numeral 5 indicates the tire, and 6 the rim of the wheel to which the invention is applied.

I have illustrated the device in connection with a solid rubber tire, but it will be understood that the device is equally adapted to be applied to a pneumatic tire, or, in fact, for any purpose where the ends of a chain are to be united. The chain section 7 is passed around the tire and rim, and the links 8 and 9 are connected by means of the hook member which substantially is in the shape of a U, having a straight shank portion or bight 10, and legs 11 and 12 which terminate in outwardly extending end portions 13 and 14, which are thus offset from the shank 10.

An elongated closed loop 15 surrounds the leg portions of the hook and closely engages the same between the projecting ends 13 and 14, and the links 8 and 9, thus securely locking the latter, and preventing the same from being removed from the end portions of the hook.

Figure 3:
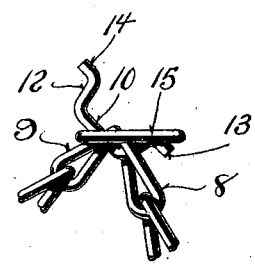
Figure 3 is a side elevation thereof, showing the manner by which the hook may be inserted or removed.

In order to remove or insert the hook thru the links 8 and 9, the latter are drawn up into or partially thru the loop 15, as illustrated in Figure 3, in which position one of the ends, as for example 14, and the adjacent leg 12 may be raised out of the loop 15, thus permitting the hook to be drawn endwise and the other end 13 to pass downwardly thru the loop and out of the links 8 and 9.

From the foregoing description, it will be seen that when the ends of the chain are united in the position shown in Figure 1, the hook is securely locked against accidental removal and, at the same time, the hook may be easily raised to draw the links into the loop sufficiently to allow the removal of the hook, as indicated in Figure 3, only a very little slack in the chain being necessary for this purpose.

While I have shown a hook as being used to unite the end links of the chain section, it will be apparent that other links of the chain may be so united, leaving the end links idle.

It will also be understood that while I have shown one specific form in which the principles of my invention may be embodied, various modifications may be made in the minor details thereof without departing from the scope of the invention.

I claim:

1. A detachable chain hook comprising a shank having offset oppositely projecting ends insertible through the respective links of a chain, and means removably secured between the offset ends and the respective links to lock the latter to the hook, said means permitting removal of each of said ends of said shank.

2. A detachable chain hook compising a shank having offset oppositely projecting ends insertible through the respective chain links which are to be connected and a closed loop closely surrounding the hook, between the projecting ends thereof and the chain links, to lock the latter to the hook, said hook being removable from the loop only upon drawing said chain links partially through the latter.

3. A device of the character described comprising a substantially U-shaped hook with the free ends of the U turned outwardly, an elongated closed loop surrounding and closely engaging the legs underneath the outwardly turned ends, and a chain the end links of which engage over respective legs of the hook underneath the loop whereby the latter serves as a lock, the end portions of said end links being insertible through the loop whereby either end of the hook may be removed therefrom.

In testimony that I claim the foregoing I have hereunto set my hand at London, in the county of Dane and State of Wisconsin.

JOHN G. RIEFF.